United States Patent
Pinard (10) Patent No.: US 6,363,140 B1
(45) Date of Patent: Mar. 26, 2002

(54) DIALABLE SCREENING PROFILE

(75) Inventor: Debbie Pinard, Kanata (CA)

(73) Assignee: Mitel Knowledge (CA)

( * ) Notice: Subject to any disclaimer, the term of this patent is extended or adjusted under 35 U.S.C. 154(b) by 0 days.

(21) Appl. No.: 09/121,354

(22) Filed: Jul. 23, 1998

Related U.S. Application Data (60) Provisional application No. 60/054,573, filed on Aug. 1, 1997.

(51) Int. Cl.[7] ............................................... H04M 1/64
(52) U.S. Cl. ................................. 379/88.22; 379/90.01
(58) Field of Search ........................... 379/88.13, 88.14, 379/88.17, 88.18, 88.22, 88.23, 90.01, 93.02, 93.24, 102.01, 102.02; 348/14.06; 709/217, 218, 219

(56) References Cited

U.S. PATENT DOCUMENTS

| | | |
|---|---|---|
| 5,243,643 A | 9/1993 | Sattar et al. |
| 5,329,578 A * | 7/1994 | Brennan et al. ............... 379/67 |
| 5,377,354 A | 12/1994 | Scannell et al. |
| 5,568,540 A | 10/1996 | Greco et al. |
| 5,631,954 A | 5/1997 | Evans et al. |
| 5,638,494 A | 6/1997 | Pinard et al. |
| 5,742,905 A * | 4/1998 | Pepe et al. ................... 379/210 |
| 5,870,454 A * | 2/1999 | Dahlen ..................... 379/88.14 |
| 5,987,100 A * | 11/1999 | Fortman et al. .......... 379/88.14 |
| 6,157,924 A * | 12/2000 | Austin ........................... 707/10 |
| 6,203,192 B1 * | 3/2001 | Fortman .................. 379/88.14 |

FOREIGN PATENT DOCUMENTS

| | | |
|---|---|---|
| WO | 9529451 | 11/1995 |
| WO | 9635994 | 11/1996 |

* cited by examiner

*Primary Examiner*—Scott L. Weaver
(74) *Attorney, Agent, or Firm*—Jones, Day, Reavis & Pogue (57) ABSTRACT

Dialable user profiles are established via a software user agent in a telecommunications system for filtering mixed-media messages, including electronic mail and voice mail. According to the software agent of the present invention, the user creates, stores and retrieves a plurality of user profiles which indicate how inbound messages are to be sorted and prioritized. The user selects and invokes a particular profile which is appropriate to a given situation, such as remote computer dial up, pay phone dial up, cellular dial up, etc. The user agent resides in a message server of the data communication network and interprets commands from the user via remote terminal or touch-tone pad to retrieve and apply the requested profile.

34 Claims, 6 Drawing Sheets

USER AGENT PSUEDO CODE

WHILE waiting for a message DO

: IF message received THEN

: : CASE message type OF

: : : SETUP REQUEST

: : : : DISPLAY CURRENT PROFILES

: : : : ACCEPT NEW DATA

: : : : UPDATE DATABASE

: : : INVOCATION :

: : : : GET PROFILE # FROM USER

: : : : RETRIEVE DATA FROM DATABASE

: : : : SET UP CALL SCREENING

: : : : RETRIEVE APPROPRIATE E-MAIL & VOICE

: : : : . MAIL MESSAGES

: : : : GIVE USER MAIL MESSAGES

: : END CASE

: ENDIF

ENDWHILE

FIG.4

POSSIBLE USER SETUP SCREEN:

PROFILE # : 1
CALL SCREENING LIST : ALL
       EXCEPTIONS : BOSS
                    WIFE

E-MAIL SCREENING LIST : JUNK MAIL
                        BROADCASTS

VOICE MAIL SCREENING LIST : ALL
             EXCEPTIONS : BOSS
                          WIFE
                          LAWYER

FIG.5

DIALABLE SCREENING PROFILE

This Appln claims benefit of Prov. No. 60/054,573 filed Aug. 1, 1997.

FIELD OF THE INVENTION

The present invention relates in general to messaging systems, and more particularly to a method and apparatus for creating custom user profiles for filtering and prioritizing messages to be retrieved from a message server.

BACKGROUND OF THE INVENTION

It is recognized that users who dial up a data communication network for retrieving mixed-media messages, including electronic mail and voice mail, are not always able or willing to receive all of their messages. For example, if a recipient has only a telephone, and therefore can only receive voice mail, if time is limited he or she may only wish to receive high priority messages or short messages, etc. According to most present day voice mail messaging systems, the user is required to listen to each message, and decide whether to save or discard the message before listening to the next message. Some systems offer a "skip" feature or fast forward. For e-mail messaging systems, all messages are down loaded, which consumes time and results in additional on-line charges. For e-mail messaging systems having text-to-speech converters, time and costs are incurred in listening through all of the message subjects as they are read back to the user.

It is known in the prior art to utilize a software agent to apply selection criteria to the attributes of a message. In some cases, the attributes are added by the sender and in others they are derived from the received information by the agent. In the most sophisticated prior art systems, rules are applied to the content of the message. Attributes of a message can include information about the sender, about the recipient, about its content or about its delivery.

U.S. Pat. No. 5,243,643 (Sattare et al) teaches a stored user profile that allows the user interface to voice messaging to be reconfigured according to the user's preferences. The user profile can be retrieved, used and edited using a DTMF pad.

U.S. Pat. No. 5,377,354 (Scannell et al) teaches sorting and prioritizing of electronic mail by applying rules to the content of a message. The user created rules are modified using a computer keyboard.

In the context of a wide area network, PCT/US96/06568 (Finney et al) describes a method of delivering electronic messages according to the recipient's preferences. In this prior art system, it is assumed that recipient's preferences will include forwarding instructions and that it is therefore desirable for the profile to be applied at the distribution point. Thus, this reference is relevant for teaching storage of recipient preferences to modify delivery.

In PCT/US95/05070 (Rose et al) a "profile of interests" is stored for each user having access to an information system. In this patent, the criterion of "relevance" of the information is taught. It is suggested that the technique could be used to filter e-mail. The system of Rose et al uses sorting based on inspection of content. Thus, upon accessing the system from a remote location, a message server retrieves the user's profile from a user database. This profile is used to rank the messages stored within the system such that all of the messages addressed to that user are ranked and only those messages that are particularly pertinent to the user's interest are highly ranked, whereas junk mail messages are given a low ranking.

U.S. Pat. No. 5,568,540 (Greco et al) teaches integrated voice mail and e-mail systems, such as are generally known in the art.

SUMMARY OF THE INVENTION

According to the present invention, a software agent is provided for allowing a user to set up different "profiles" which are applicable to particular situations. Thus, when a user is at a remote location, a "profile" can be selected for pre-screening messages and phone calls so that only messages which comply with the criteria of the selected "profile" are passed on to the user. The criteria is completely selectable by the user, and may include priority, length of message, sender, etc.

Thus, whereas dialable user profiles are known in the art, as discussed above, as are interfaces from mixed media messaging and schemes for sorting documents based on parameters such as content, author, priority, etc., there is no discussion in the prior art of permitting a different user profile for selecting and sorting messages each time the messaging system is accessed, so that the profile can be changed by the user to suit the user's particular situation.

BRIEF DESCRIPTION OF THE DRAWINGS

A detailed description of the invention is provided herein below with reference to the following drawings, in which.

DETAILED DESCRIPTION OF THE PREFERRED EMBODIMENT

Figure 1A:
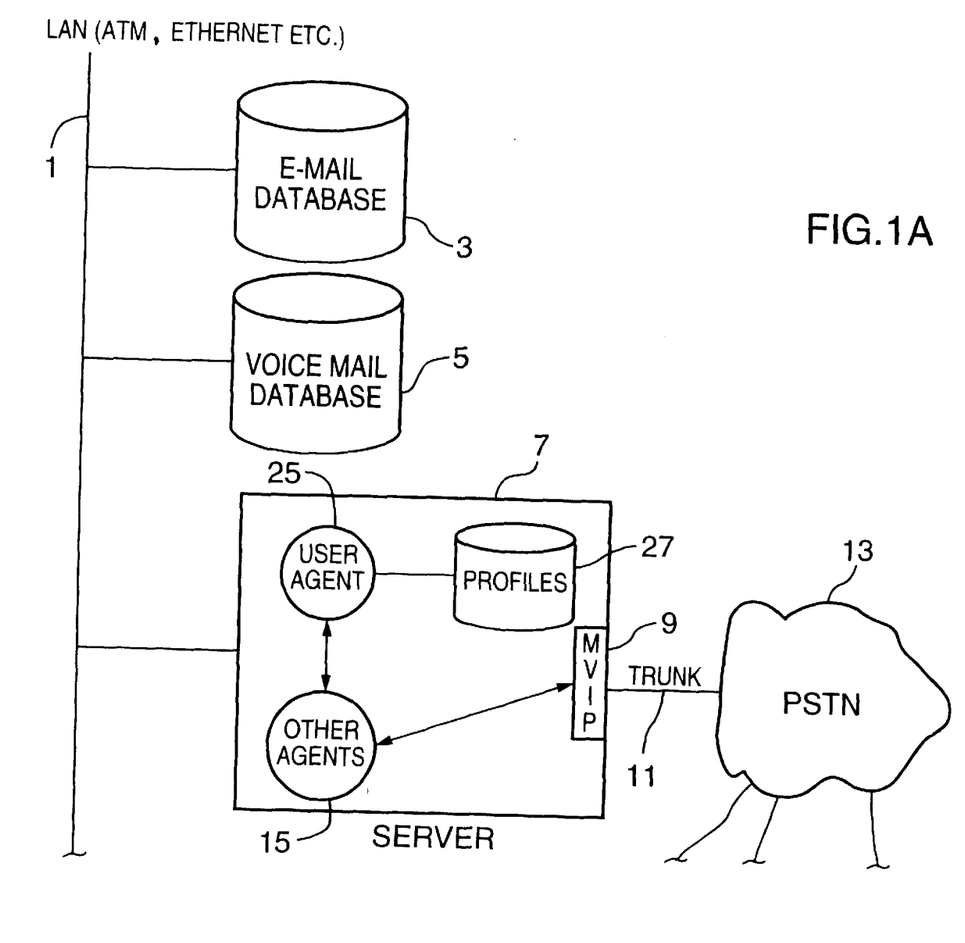
FIG. 1 is a block diagram of a messaging system for implementing the screening profiles according to the present invention.
Figure 1B:
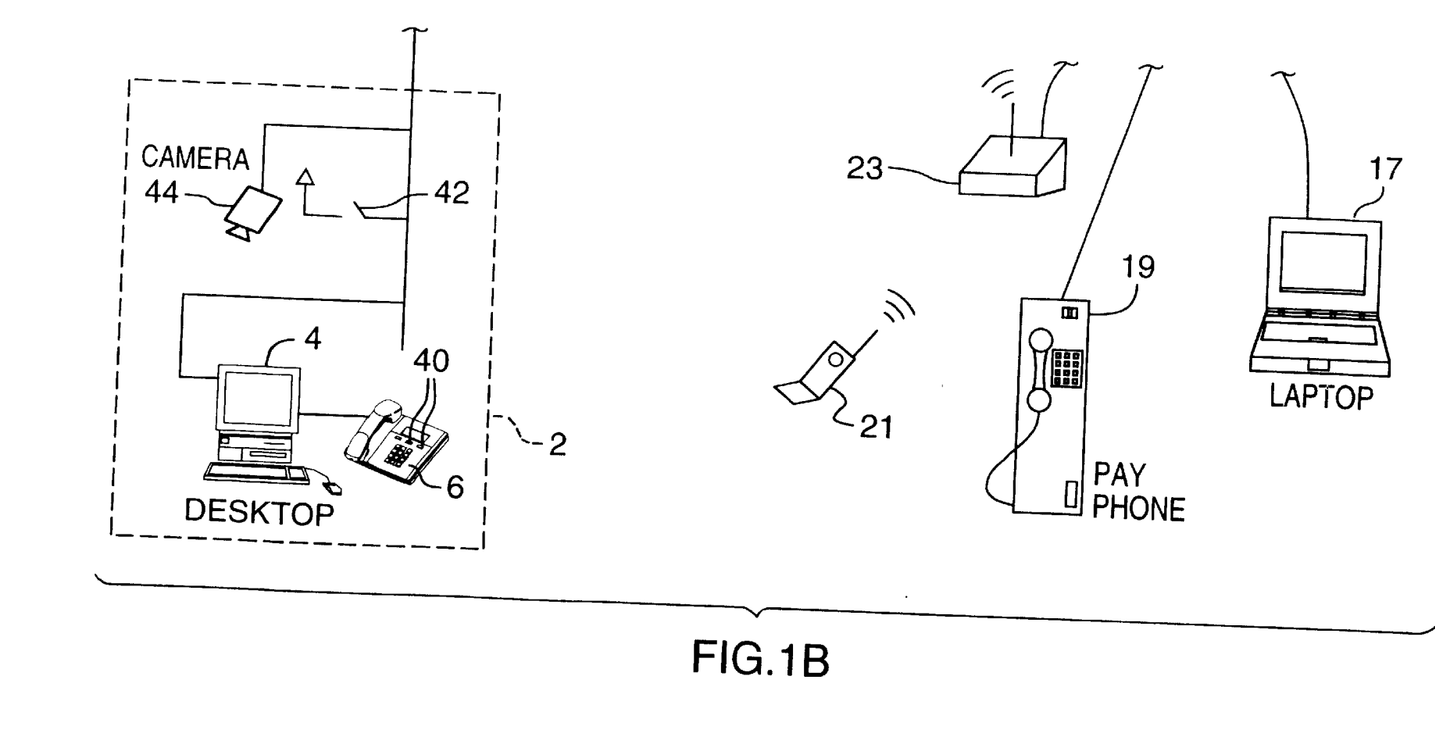

A communication system is shown in FIG. 1 for implementing the message screening profile system according to the present invention. A local area network 1 (e.g. ATM, Ethernet, etc.) provides user access to a standard e-mail database 3 and voice mail database 5 such as are commonly available in the prior art. A communication server 7 such as sold by Mitel Corporation under the trademark MediaPath® provides communication between the LAN 1 and a plurality of communication lines, such as trunk 11 connected to the public switched telephone network (PSTN) 13. A local user can access the server 7 from his or her office 2 via desktop computer 4 and/or phone 6, which may be a USB phone connected to the computer 4 or a digital phone connected to the LAN 1 via a phone hub (not shown). Interface to the trunk lines may be effected utilizing MVIP cards 9 under control of various software agents 15 (e.g. call control agent, trunk agent, etc.), such as set forth in commonly assigned U.S. Pat. Nos. 5,631,954 and 5,638,494.

Trunk line 11 provides both voice and data access from LAN 1 to the PSTN 13, and vice versa. Thus, the user of a laptop 17 can access LAN 1 via internal modem dial up through PSTN 13 and MVIP cards 9, in the manner set forth in applicant's prior mentioned U.S. patents. Similarly, the user may access LAN 1 or server 7 via a remote pay phone 19 or a cellular telephone 21 via base station 23 connected to PSTN 13.

According to the present invention, a user agent 25 is provided on server 7 to represent the user in the communication system, and is responsible for managing communications that the user has within the system, as set forth in commonly assigned U.S. Pat. No. 5,638,494. This includes the setting up, storing and activation of user profiles 27 in a database, according to the principles of the present invention.

Figure 2:
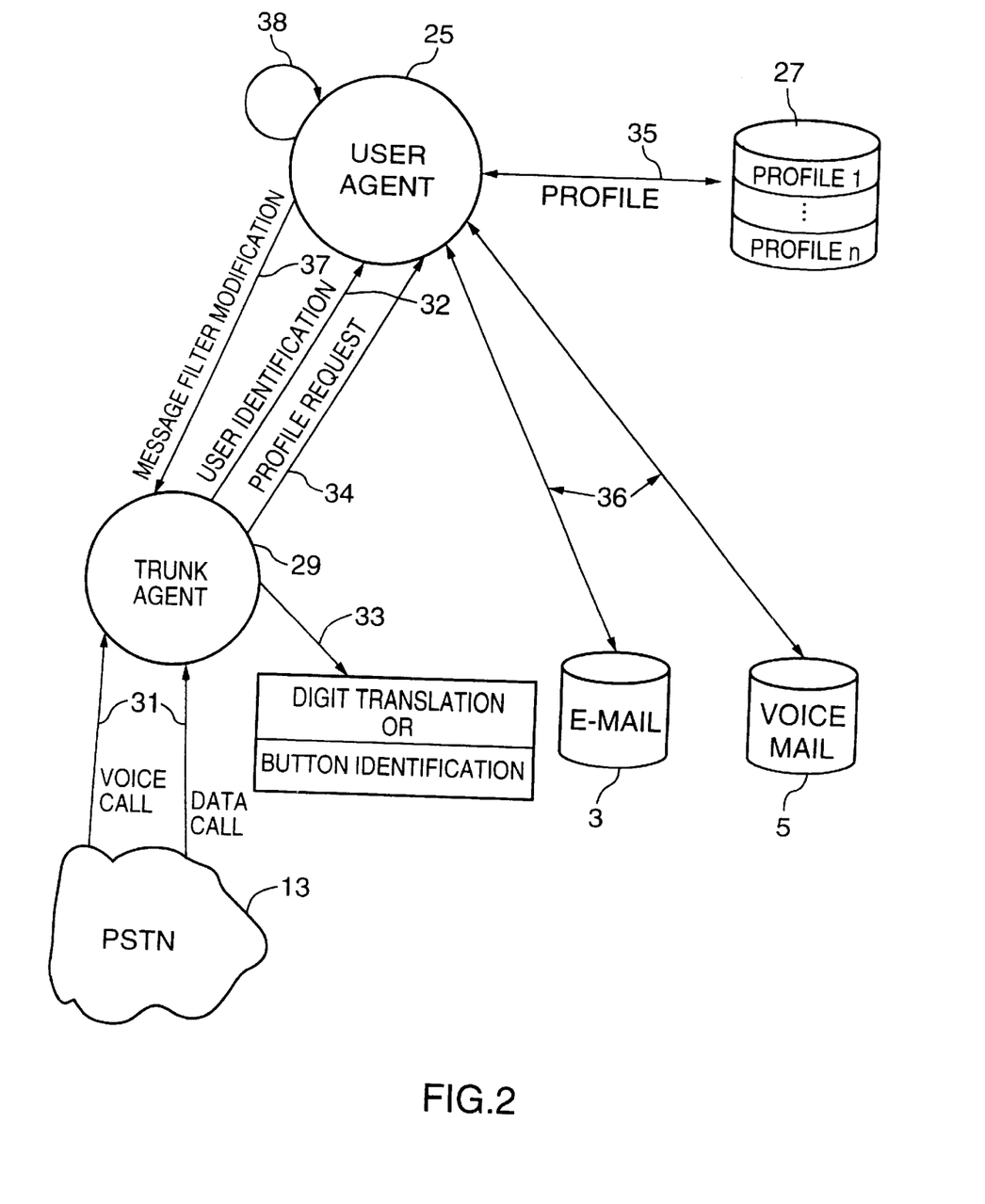
FIG. 2 shows general message flow between software agents in the messaging system of the present invention.
Figure 3:
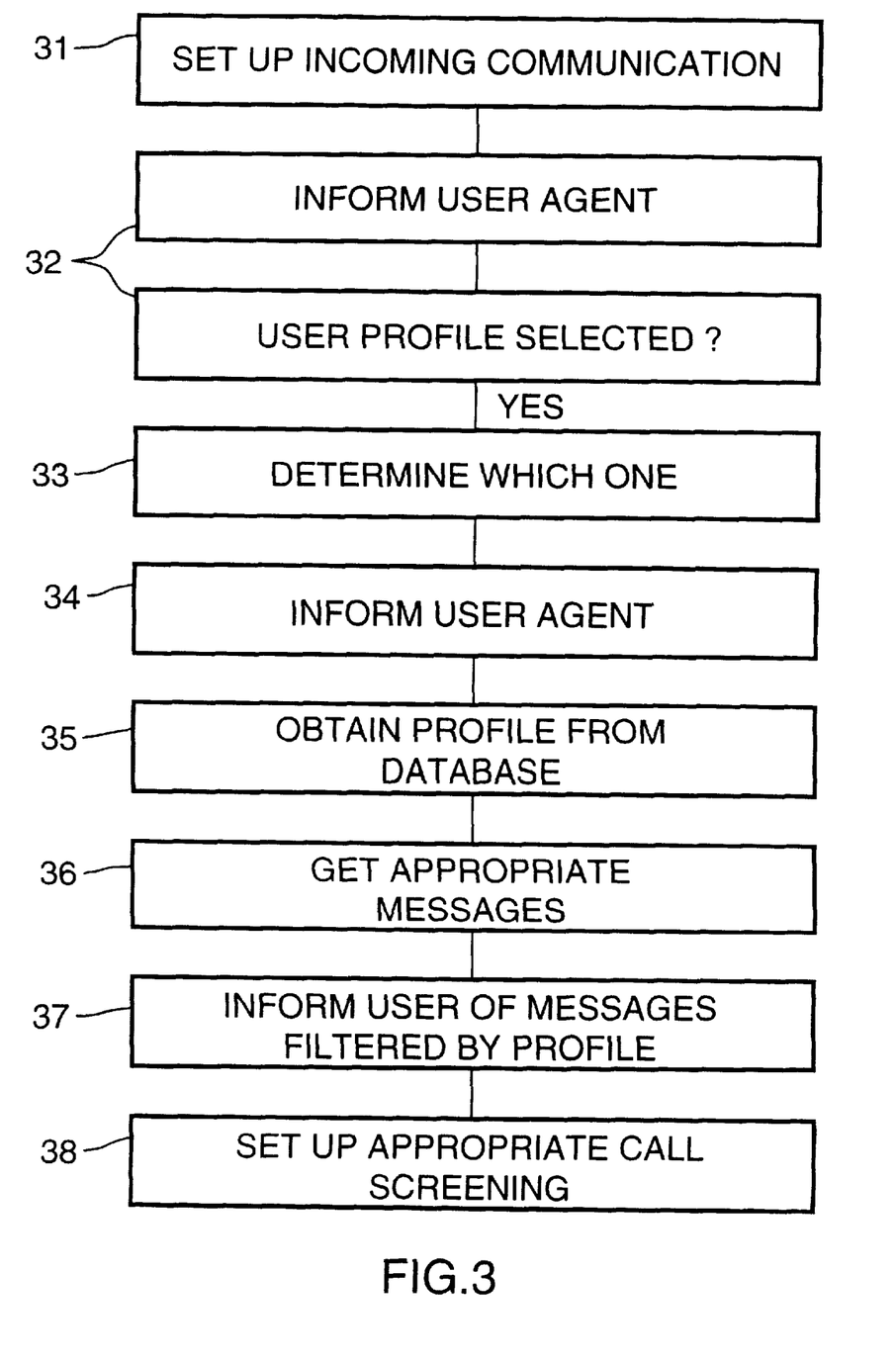
FIG. 3 is a flow chart of the messaging sequence illustrated in FIG. 2.

FIGS. 2 and 3, together, show message flow between elements of the system according to the present invention and the message sequence, when a user calls into the system from a remote location and sets up a profile.

At step 31, a voice call to the system is established from PSTN 13 via a MVIP cards 9 under control of trunk agent 29. At step 32, trunk agent 29 informs the user agent 25 corresponding to the incoming caller, that the user is accessing the system. Trunk agent 29 implements digit translation or button identification which can be implemented via MVIP cards 9, or other digital signal processing hardware within the server 7, to notify the system that the user wishes to retrieve messages. According to this process, the system ascertains whether a user profile has been selected, and if so, which profile (step 33). A profile request is passed from trunk agent 29 to the user agent 25 (step 34), which then obtains the relevant profile from profile database 27 (step 35). The user agent 25 then retrieves the appropriate messages from e-mail database 3 and/or voice mail database 5, according to the criteria set forth in the selected user profile.

Optionally, user agent 25 can inform the user via a message notification of which messages were filtered out by the selected profile (step 37).

Also, optionally, the user can invoke appropriate call screening via user agent 25 (step 38).

Figure 4:
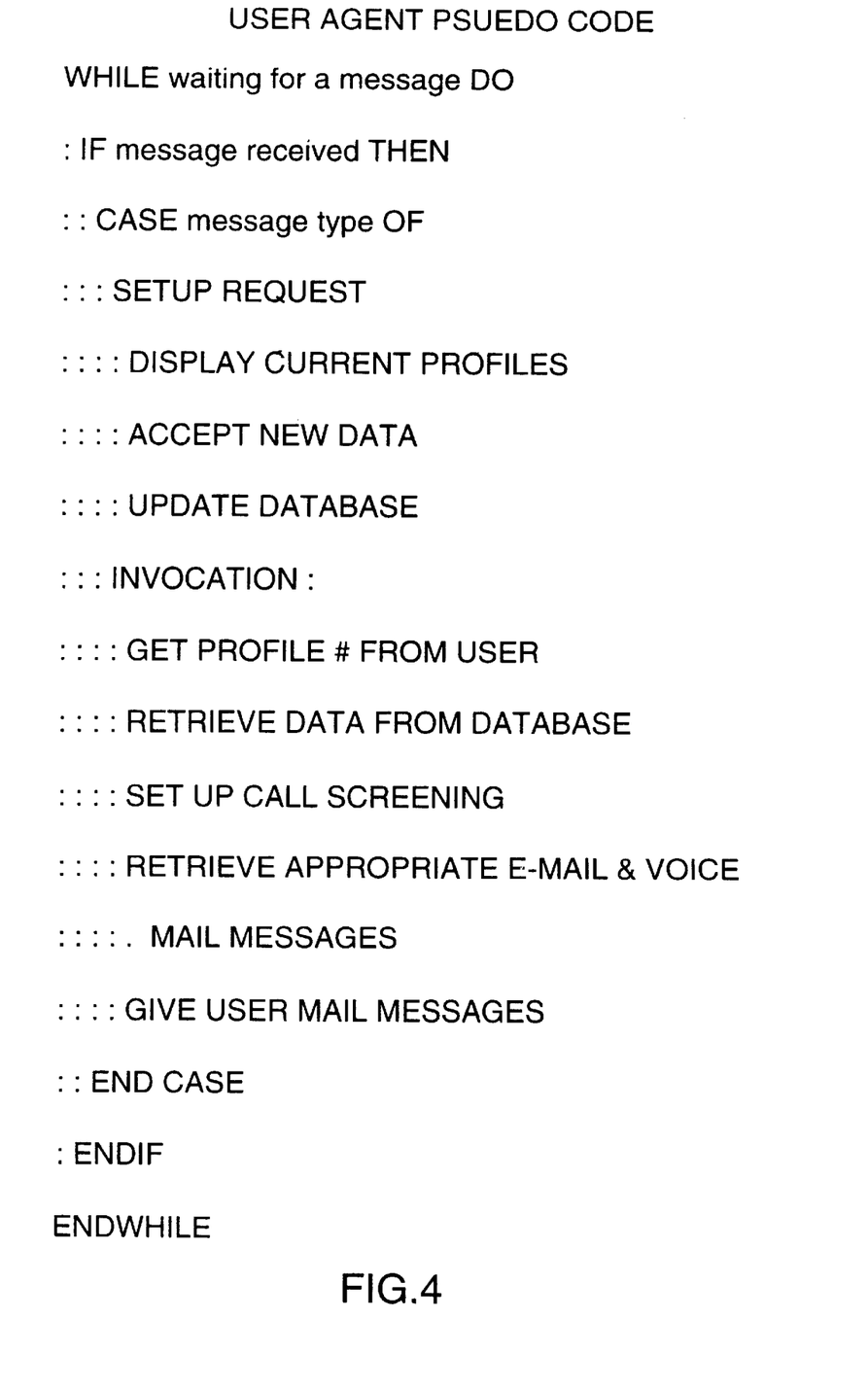
FIG. 4 is a pseudo code listing for implementation by a user agent for setting up user profiles and invoking them, according to the preferred embodiment.

The user agent 25 of the present invention can be implemented using standard software programming techniques. FIG. 4 shows possible pseudo code within the user agent 25 for setting up user profiles and invoking the profiles, as set forth in FIGS. 2 and 3. Alternatively, setting up and invoking user profiles can be effected using the techniques set forth in commonly assigned U.S. Pat. No. 5,638,494.

Figure 5:
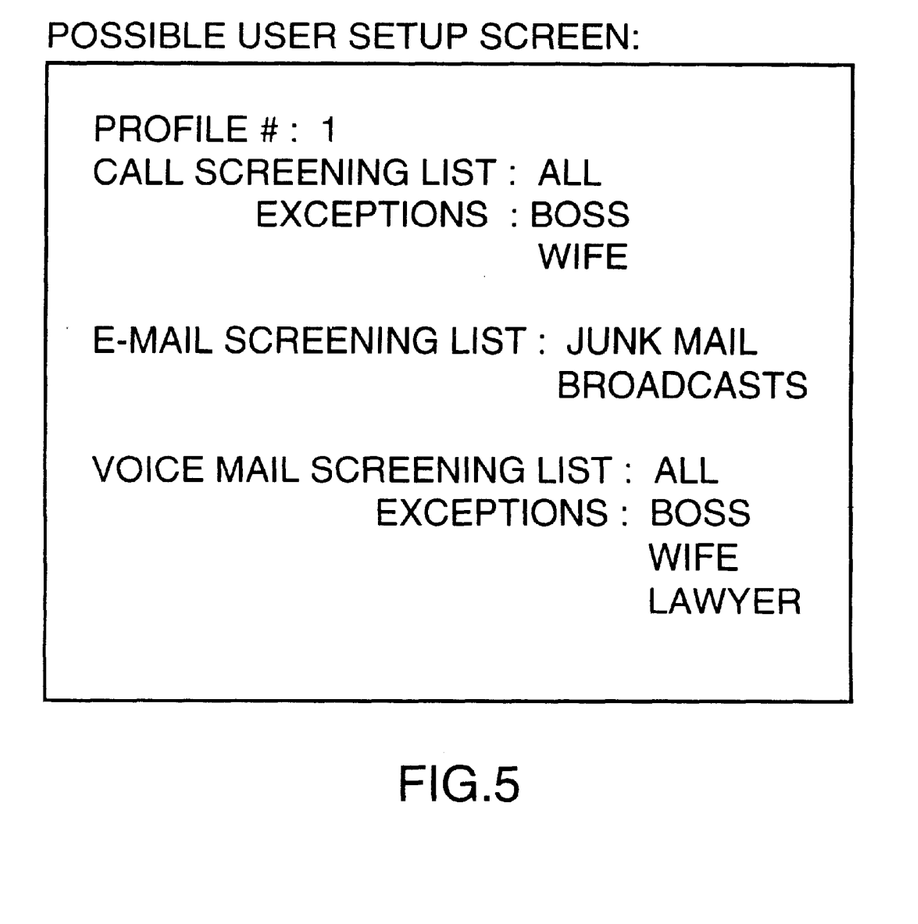
FIG. 5 shows a screen format for setting up of a profile according to the present invention.

FIG. 5 shows a user set up screen available to the user at lap top 17 or a personal computer (PC) connected directly to LAN 1. The screening profile code implemented within user agent 25 can be a standard Windows® application which communicates with the user agent 25 to supply and store the data. Names, such as "Boss" and "Wife" in FIG. 5, can be set up initially as aliases or actual e-mail addresses or phone numbers, as required.

A person understanding the principles of the present invention may conceive of other modifications and variations. For example, the system according to the present invention can be used to set up an "instant profile" for occasions when the user is at work, leaves the office, or goes on vacation. By setting up such profiles, and adding more profiles to the database 27, such as pre-recorded messages for all screened calls or mail messages to let callers know the user's status, then a plurality of selectable profiles, such as "on vacation" or "at a meeting" can be set up via a single keystroke on the user's computer 4, to cover all possible scenarios. Alternatively, a plurality of soft keys or icon keys 40 may be provided on the USB phone 6 to invoke selected profiles. Also, it is possible to automatically invoke profiles via other means such as an electric switch 42 installed in the doorway to the user's office 2 which, when closed, automatically invokes the "in a meeting" profile. Or, a camera 44 (or IR sensor, etc.) may be installed in the user's office to monitor the absence or presence of the user in the room and automatically invoke an "out of the office" profile when the room is empty. It is also contemplated that the principles of the present invention may be applied to other forms of communication such as video calls, facsimile messages, etc. All such modifications and variations are believed to be within the sphere and scope of the invention as set forth in the claims appended hereto.

I claim:

1. Apparatus for establishing and invoking screening profiles in a messaging system, comprising:

at least one message database for storing messages addressed to a predetermined user;

a profile database for storing a plurality of user profiles for screening based on predetermined criteria of said messages addressed to said predetermined user;

a trunk agent for providing said user access to said message system from a remote location; and a user agent for selecting a predetermined one of said user profiles under control of said user having access to said messaging system via said trunk agent, whereby said predetermined one of said user profiles is selected based on user preferences when said user accesses the messaging system to retrieve screened messages.

2. The apparatus of claim 1, wherein said message database is an electronic mail messaging database.

3. The apparatus of claim 1, wherein said message database is a voice mail messaging database.

4. The apparatus of claim 2, wherein said predetermined criteria includes screening of junk mail and broadcast messages.

5. The apparatus of claim 3, wherein said predetermined criteria includes screening all messages except messages from selected individuals.

6. The apparatus of claim 1, further including means for storing and playing back custom messages to callers whose messages are screened.

7. The apparatus of claim 6, wherein said custom messages include an indication of the user's status.

8. The apparatus of claim 1, wherein said message database is a video call message database.

9. The apparatus of claim 1, wherein said message database is a facsimile message database.

10. The apparatus of claim 1, further comprising a local user computer communicating with said user agent for locally involving said predetermined one of said profiles.

11. The apparatus of claim 1, further comprising a local user phone having a soft key which, when depressed, causes said phone to communicate with said user agent for locally involving said predetermined one of said profiles.

12. The apparatus of claim 1, further comprising a doorswitch on a local office door of said user which, when closed, communicates with said user agent for locally involving said predetermined one of said profiles.

13. The apparatus of claim 1, further comprising a camera in a local office of said user which detects the absence of person's from said office and in response communicates with said user agent for locally involving said predetermined one of said profiles.

14. A method of establishing and invoking screening profiles in a messaging system, comprising the steps of:

storing messages addressed to a predetermined user;

storing a plurality of user profiles for screening based on predetermined criteria of said messages addressed to said predetermined user;

providing said user access to said messaging system from a remote location;

selecting a predetermined one of said user profiles under control of said user having access to said messaging system, whereby said predetermined one of said user profiles is selected based on user preferences when said user accesses said messaging system to retrieve screened messages.

15. A messaging system, comprising:

an access interface for providing a user with access to said messaging system and for accessing at least one message database that stores messages addressed to the user;

a profile database for storing a plurality of user profiles of the user, each of the user profiles having user preferences expressed as predetermined criteria to select certain of the messages for retrieval; and a user agent, for selecting one of the user profiles from the plurality of user profiles and retrieving certain of the messages to be received by the user in accordance with a selected one of the user profiles, in response to the user accessing said messaging system for message retrieval.

16. The messaging system of claim 15, wherein the selected one of the user profiles is selected based on input from the user on accessing said messaging system for message retrieval.

17. The messaging system of claim 16, wherein the input from the user comprises at least one of pressing of a soft key on a telephone, and instructions from a user computer.

18. The messaging system of claims 16, wherein said message database comprises at least one of an electronic mail messaging database, a voice mail messaging database, a video call messaging database, and a facsimile messaging database.

19. The messaging system of claim 15, wherein the access interface further comprises a monitor agent for receiving input from other sources that indicate situations of the user; whereby said input from other sources is communicated to the user agent for selection of said one of the user profiles of the plurality of user profiles.

20. The messaging system of claim 19, wherein said input from other sources comprises input from at least one of an electric switch, a camera, and an IR sensor.

21. The messaging system of claim 15, wherein the access interface further receives an input; each of the user profiles further includes settings to configure said messaging system; and the user agent further selects one of the user profiles from the plurality of user profiles in response to said input and configures said messaging system in accordance with the selected one of the user profiles.

22. The messaging system of claim 21, wherein said input is from at least one of the user, an electric switch, a camera, and an IR sensor.

23. The messaging system of claim 21, wherein the settings further includes user messages for senders who are contacting the user, whereby the user agent configures said messaging system to send said user messages accordingly to the selected one of the user profiles.

24. The messaging system of claim 23, wherein the user messages further comprise at least one of a voice message to callers and a responding message to indicate status of the user.

25. A method to retrieve messages from a messaging system having access to at least, one message database that stores messages addressed to a user, comprising:

providing a user with access to said messaging system;

storing a plurality of user profiles of the user, each of the user profiles having user preferences expressed as predetermined criteria to select certain of the messages for retrieval; and selecting one of the user profiles from the plurality of user profiles and retrieving certain of the messages to be received by the user in accordance with a selected one of the user profiles, in response to the user accessing said messaging system for message retrieval.

26. The method of claim 25, wherein the selected one of the user profiles is selected based on input from the user on accessing said messaging system for message retrieval.

27. The method of claim 26, wherein the input from the user comprises at least one of pressing of a soft key on a telephone, and instructions from a user computer.

28. The method of claim 26, wherein said message database comprises at least one of an electronic mail messaging database, a voice mail messaging database, a video call messaging database, and a facsimile messaging database.

29. The method of claim 25, further comprising receiving input from other sources that indicate situations of the user; whereby said input from other sources is used to select said one of the user profiles of the plurality of user profiles.

30. The method of claim 29, wherein said input from other sources comprises input from at least one of an electric switch, a camera, and an IR sensor.

31. The method of claim 25, further comprising receiving input; including settings to configure said messaging system to the user profiles; and selecting one of the user profiles from the plurality of user profiles in response to received said input and configuring said messaging system in accordance with the selected one of the user profiles.

32. The method of claim 31, wherein the settings further includes user messages for senders who are contacting the user so that said messaging system sends said user messages in accordance with the selected one of the user profiles.

33. The method of claim 32, wherein the user messages further comprise at least one of a voice message to callers and a responding message to indicate status of the user.

34. The method of claim 31, wherein said input is from at least one of the user, an electric switch, a camera, and an IR sensor.

* * * * *

UNITED STATES PATENT AND TRADEMARK OFFICE
CERTIFICATE OF CORRECTION

PATENT NO. : 6,363,140 B1
DATED : March 26, 2002
INVENTOR(S) : Pinard

It is certified that error appears in the above-identified patent and that said Letters Patent is hereby corrected as shown below:

<u>Title page,</u>
Item [73], the name of the Assignee should read
-- Mitel Knowledge Corporation --

Signed and Sealed this

Fourth Day of February, 2003

JAMES E. ROGAN
*Director of the United States Patent and Trademark Office*